United States Patent
Morimatsu

(10) Patent No.: US 6,842,267 B1
(45) Date of Patent: Jan. 11, 2005

(54) IMAGE PROCESSING METHOD

(75) Inventor: Hiroyuki Morimatsu, Kurume (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 968 days.

(21) Appl. No.: 09/580,524

(22) Filed: May 30, 2000

(30) Foreign Application Priority Data

Jun. 10, 1999 (JP) .......................................... 11-163286

(51) Int. Cl.$^7$ ............................................... H04N 1/40
(52) U.S. Cl. .................................... 358/3.03; 358/3.15
(58) Field of Search .............................. 358/3.13–3.15, 358/3.01–3.09, 1.9, 1.2, 534–536; 382/237

(56) References Cited

U.S. PATENT DOCUMENTS 5,216,753 A * 6/1993 Ng ............................. 358/1.9
5,778,105 A * 7/1998 Shively ....................... 382/269

FOREIGN PATENT DOCUMENTS

JP         6005881         7/1998

* cited by examiner

Primary Examiner—Thomas D. Lee
Assistant Examiner—Stephen Brinich
(74) Attorney, Agent, or Firm—Stevens, Davis, Miller & Mosher, LLP

(57) ABSTRACT

An image processing method and an image processing apparatus for generating a binary image by binarizing the pixels of multlvalued tones are disclosed. An intended pixel, at least a pixel adjacent to the intended pixel and the density difference between the intended pixel and the adjacent pixel are determined. In the case where the density difference is larger than a predetermined setting, the intended pixel is determined as an edge portion. The binarization threshold for the intended pixel constituting an edge portion is set lower, the larger the edge intensity with the adjacent pixel. Thus, the edge reproducibility of the binary image after error spreading is improved.

4 Claims, 5 Drawing Sheets

IMAGE PROCESSING METHOD

BACKGROUND OF THE INVENTION

1. Field of the Invention

The present invention relates to an image processing method and an image processing apparatus used with a printer, a scanner, a duplicator, a facsimile, etc. for reproducing the multivalued image information as a binary image.

2. Description of the Related Art

The error spreading method is widely known as one of the methods for converting a multivalued image into a binary image.

FIG. 5 is a block diagram showing a conventional circuit for executing the error spreading method.

In FIG. 5, the multlvalued data D of an intended pixel to be binarized is read from an image memory 100, and subjected to γ correction into the multivalued data corresponding to the printing characteristics of an output device such as a printer with reference to the correction data stored in a γ correction ROM 101. The error data E of the intended pixel is added to the multivalued data D' subjected to γ correction by an adder 102 of an error spread processing unit 107, so that F=D'+E is output.

The data F of the intended pixel to which the error data has been added is compared with a binary threshold value Th in a comparator 104, and in the case where F≧Th, a binary signal B="1" is output, while in the case where F<Th, a binary signal B="0" is output. From this output result, the binarization error E' is calculated as E'=F−B' by a subtractor 106.

In the case where the input data has 256 tones (0 to 255), B'=B×255. In the case where the input multivalued data D is 230 and the binarization threshold value Th is 128, for example, the output data after binarization is B=1, so that the binarization error E' is given as E'=D−B×255=230−1×255=−25.

This binarization error E is stored in an error memory 103 in order to distribute it among the data of the pixels subsequently processed in accordance with a predetermined error matrix Mxy in a weighted error calculator 105, and added to the multivalued data of the next pixel by an adder 102, thereby transmitting the error data.

Specifically, in the case under consideration involving the input multivalued data D of 230, the comparison with the binarization threshold Th=128 shows that the output data after binarization is 1 corresponding to 255 out of 256 tones. Thus, an error of 25 develops with respect to 230 of the input multivalued data D. The error 25 with respect to the input multivalued data D of 230 is determined as a binarization error and distributed to the error memory 103 of unprocessed pixels by the weighted error calculator 105 using an error matrix and thus reflected in the subsequent pixel binarization.

The error matrix used in the conventional error spreading method is shown in FIG. 6.

In FIG. 6, the pixel indicated by * is the existing intended pixel to be binarized.

The error generated in binarizing this intended pixel is distributed to the unprocessed the next pixels with the weighting coefficients (7, 1, 5, 3) shown in FIG. 6. In binarizing the intended pixel indicated by *, the error distribution value stored is read from the error memory 103, and the next input value read from the image memory 100 is corrected using this error distribution value.

As described above, according to the error spreading method, the binarization error for a given pixel is distributed to the pixel data to be subsequently binarized thereby to minimize the error between the image data after binarization data and the original multivalued image data.

The image binarized by the error spreading method poses the problem of the reproducibility of the edge portion of the binarized image due to the fact that the error is distributed to the surrounding pixels. In other words, since the information of the surrounding pixels is partly added to the intended pixel, the reproducibility of the edge portion of the image is deteriorated.

The conventional approach to this problem is a method of improving the edge retention by emphasizing the edge portion of the original multivalued data through a high-pass filter or the like.

This method, however, gives rise to a new problem of the image quality deterioration with the whole image affected by the filtering, and therefore fails to solve the problem in the true sense of the words.

SUMMARY OF THE INVENTION

The object of the present invention is to provide an image processing method capable of improving the edge reproducibility of a binary image after error spreading.

In order to achieve this object, according to one aspect of the invention, there is provided an image processing method for generating a binary image by binarizing the pixel of the multivalued tone, comprising the steps of determining an intended pixel, determining pixels adjacent to the intended pixel, determining the density difference between the intended pixel and the adjacent pixels, and setting a threshold value for the binarization of the intended pixel thereby to binarize the intended pixel according to the density difference.

In the case where the density difference (edge intensity) is large between the intended pixel and the adjacent pixels, the binarization threshold is set to a low value to increase the probability of dot generation, and otherwise the binarization threshold is set to a high value to decrease the probability of dot generation. Thus, the edge reproducibility of the binary image after the error spreading process can be improved.

DESCRIPTION OF THE EMBODIMENTS

An embodiment of the present invention will be explained below with reference to the accompanying drawings.

Figure 1:
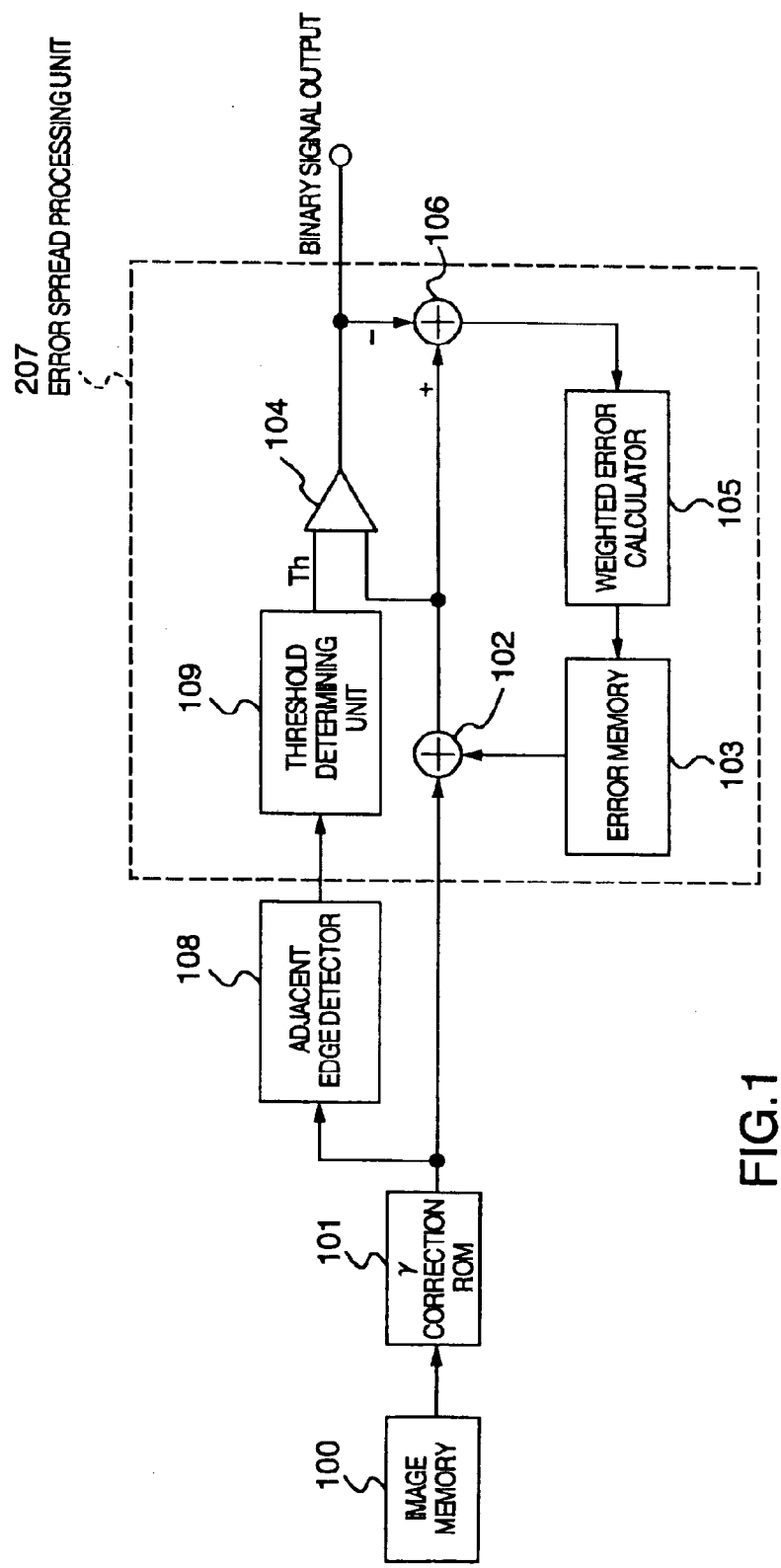
FIG. 1 is a block diagram showing a circuit for executing an image processing method according to an embodiment of the invention.

As shown in FIG. 1, the multivalued data D of the intended pixel to be binarized is read from an image memory 100, and subjected to γ correction into the multivalued data corresponding to the printing characteristic of an output device such as a printer with reference to the correction data stored in a γ correction ROM 101. The γ-corrected multi-valued data is subjected to edge detection by an adjacent edge detector 108 for detecting the edge portion adjacent to the intended pixel, after which a threshold level is determined by a threshold determining unit 109 of an error spread processing unit 207. Also, the error data in the intended pixel is added in an adder 102.

The data on the intended pixel with the error data added thereto is compared with the threshold value determined by the threshold determining unit 109 in a comparator 104 thereby to output a predetermined binary signal. From this output result, the binarization error is calculated by a subtractor 106.

This binarization error is stored in an error memory 103 for distribution to the data of the pixels subsequently processed according to a predetermined error matrix Mxy, added to the multivalued data of the next pixel in the adder 102, thereby transmitting the error data.

The adjacent edge detector 108 is for detecting whether the intended pixel being binarized constitutes an edge portion or not, and outputs the information as to whether the intended pixel constitutes an edge portion or not based on the multivalued data in the intended pixel and the left and right adjacent pixels. The process for detecting an edge portion will be described later.

Also, in the case where the intended pixel is detected as an edge portion by the adjacent edge detector 108, the threshold determining unit 109 sets a binarization threshold in accordance with the edge intensity in order to improve the edge reproducibility of the intended pixel.

Now, the detection and retention of the edge will be explained with reference to FIG. 2.

Figure 2:
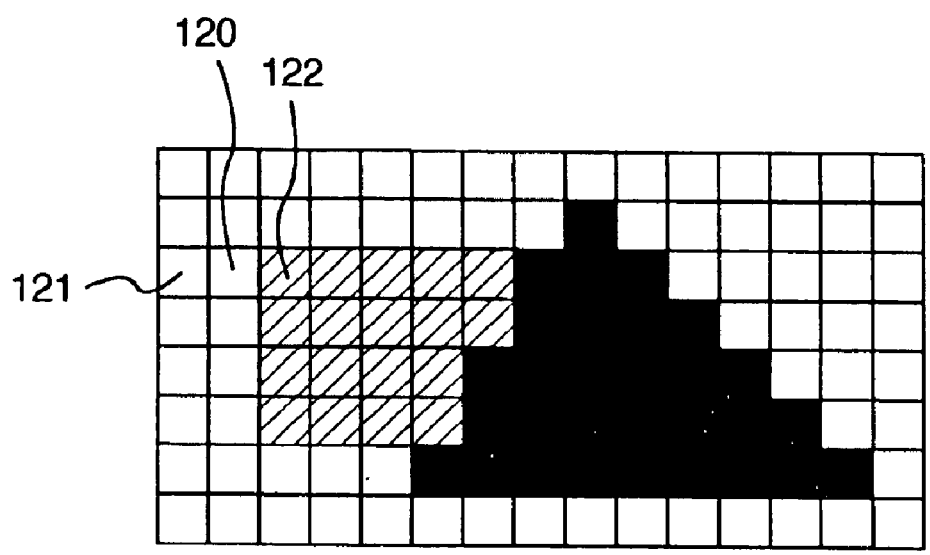
FIG. 2 is a diagram for explaining the pixels detected as an edge portion in an image processing method according to an embodiment of the invention.

In FIG. 2, the image of the multivalued data to be binarized is shown. This multivalued data is represented by 256 tones (0 to 255) of data. In FIG. 2, the density of the intended pixel 120 and the adjacent pixel 121 is assumed to be 0, and the density of the adjacent pixel 122 is assumed to be 128.

In this case, the pixel with the right and left adjacent pixels to be detected as an edge portion is the intended pixel 120. In the image of this pixel after binarization, no dot is generated and the adjacent pixel 122 is a pixel that is to retain the edge portion. Also, the adjacent pixels 121, 122 are adjacent to the left and right sides of the intended pixel 120. In order to calculate the density difference between the left and right pixels of the intended pixel 120, the density is referenced at the time of edge detection.

Now, assuming that the intended pixel is 120, an explanation will be given of the detection as to whether there is any edge portion adjacent to this intended pixel. Assume that the density data of the intended pixel 120 is D1, the density data of the adjacent pixel 121 is D2, the density data of the adjacent pixel 122 is D3, and the density difference of the intended pixel 120 with the pixels 121 and 122 adjacent to the left and right sides thereof are DL and DR, respectively. The density difference of the intended pixel 120 with the left adjacent pixel 121 and the right adjacent pixel 122 are given as DL=|D1−D2| and DR=|D1−D3|, respectively.

In the case where this value exceeds a predetermined value S, the intended pixel 120 is detected as an edge portion. In other words, in the case where the relation DL>S or DR>S holds, the particular intended pixel is determined as an edge portion.

Although the left and right adjacent pixels of the intended pixel are assumed to be adjacent pixels in this embodiment, the density of the upper and lower adjacent pixels or all the adjacent pixels including the left and right adjacent pixels or the surrounding pixels can be referenced to improve the edge detection accuracy and perform the control operation in accordance with the edge position, thus further improving the edge reproducibility.

Now, an explanation will be given of the operation of controlling the dot generation upon detection of left and right adjacent edges of the intended pixel.

With the pixel of which the left or right adjacent edge has been detected, the edge retaining process is executed by controlling the dot generation in accordance with the density difference between the intended pixel and the left and right adjacent pixels. In this way, the reproducibility of the left and right adjacent edges can be improved. In controlling the dot generation, the rate of dot generation can be reduced by changing the threshold for binarization of the pixel of which left and right adjacent edges have been detected.

Figure 3:
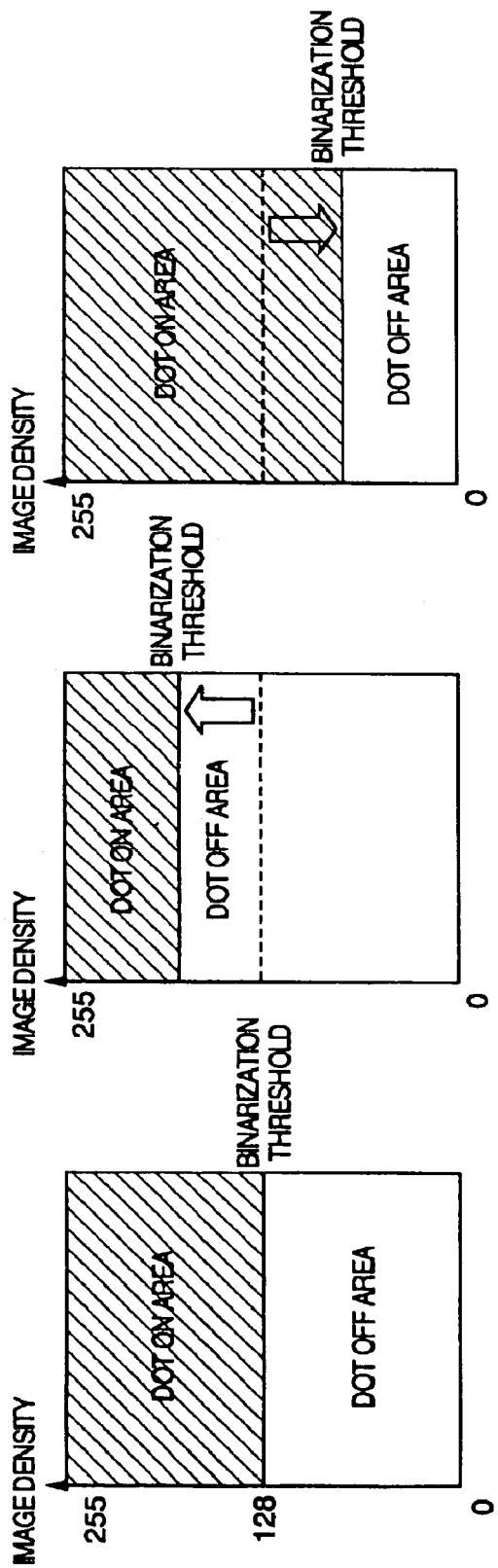
FIGS. 3A, 3B, 3C are diagrams for explaining the setting of a threshold value for the binarization process in an image processing method according to an embodiment of the invention.

This process will be explained with reference to FIGS. 3A to 3C showing the relation of the dot on/off with respect to the setting of the density and the threshold of the image data for the error spread operation.

Generally, the binarization threshold in the conventional error spreading method, as shown in FIG. 3A, is set and fixed at about 128 intermediate of the input density of 256 tones. According to this embodiment, on the other hand, as shown in FIG. 3B, the dot off area is widened by increasing the binarization threshold for the pixel of which left and right adjacent edges have been detected. In this way, the dot generation is suppressed in the particular pixels so that the dot generation is reduced in the pixels adjacent to the edge thereof, thereby improving the reproducibility of the edge portion.

Also, as shown in FIG. 3C, the dot on area is widened by reducing the binarization threshold for the pixel of which right and left adjacent edges have been detected, so that the dot generation is facilitated in this pixel.

In this way, a more faithful edge reproduction is made possible by changing the threshold value in accordance with the edge intensity with the left and right adjacent pixels of an intended pixel detected as an edge portion.

Specifically, let D be the difference in density between the intended pixel detected as an edge portion and the left and right adjacent pixels, N be a constant for setting the variation of the threshold value, and Th be a binarization threshold for the intended pixel. Then, the threshold value is set as Th=128−D/N.

As a result, for a pixel having a large edge intensity, the binarization threshold Th is set to a low value so that the probability of dot generation in the intended pixel increases. For a pixel having a small edge intensity, on the other hand, the binarization threshold Th is set to a high value and therefore the probability of dot generation is decreased, with the result that dots are not easily generated. For the pixels not determined as an edge portion, the binarization process is executed with a fixed threshold Th of 128.

According to this embodiment, the threshold Th is controlled by the aforementioned formula. A more faithful edge reproduction is possible, however, by controlling the threshold Th using a formula having a nonlinear characteristic without resorting to the formula having the aforementioned linear characteristic.

Without using a calculation formula, a more detailed setting of a threshold is made possible by preparing a table for holding threshold values corresponding to the density difference D between the intended pixel and the adjacent pixels, and setting a threshold value by reference to this table.

This binarization process will be explained with reference to the flowchart of FIG. 4.

Figure 4:
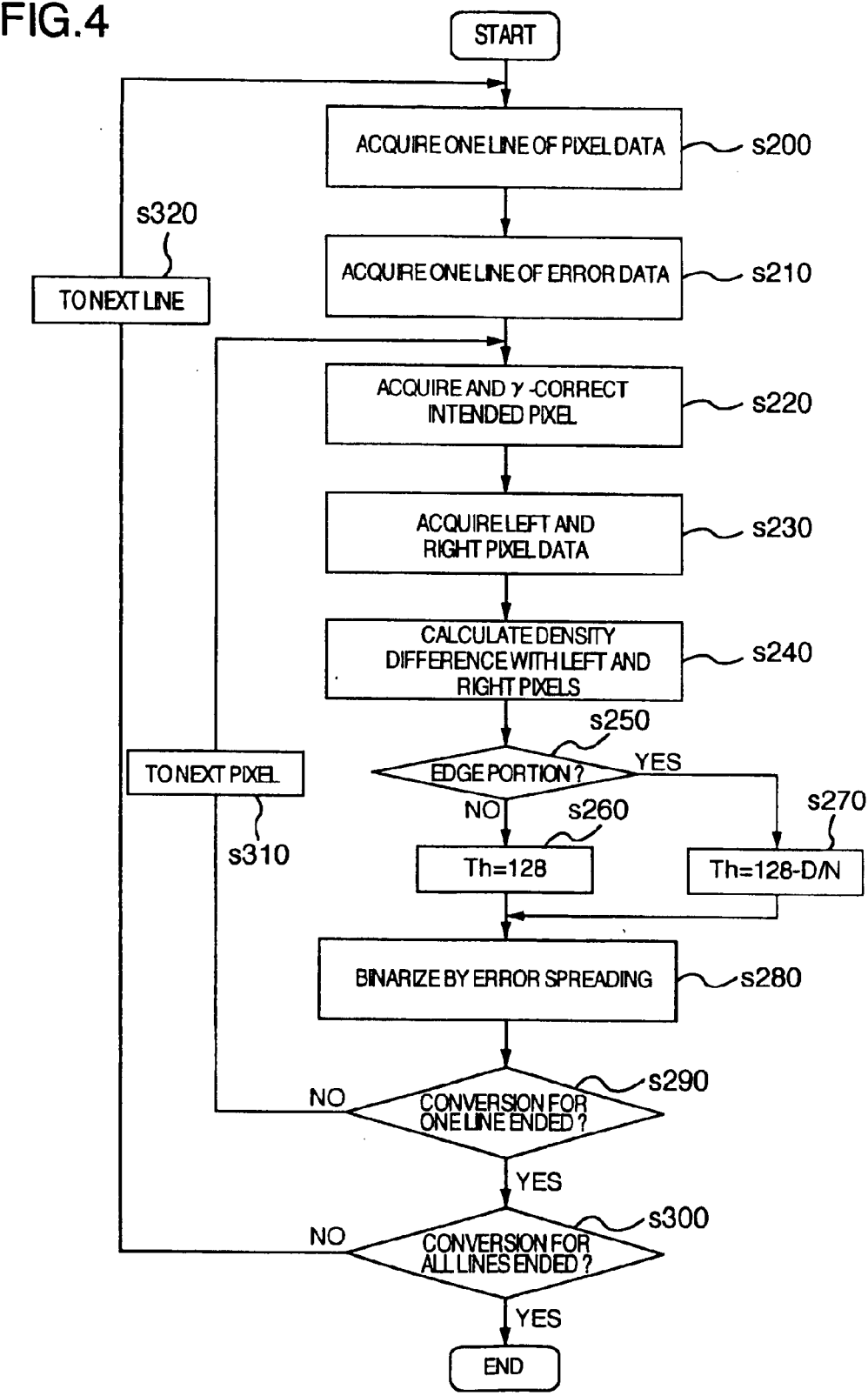
FIG. 4 is a flowchart showing the processing steps in an image processing method according to an embodiment of the invention.
Figures 5, 6:
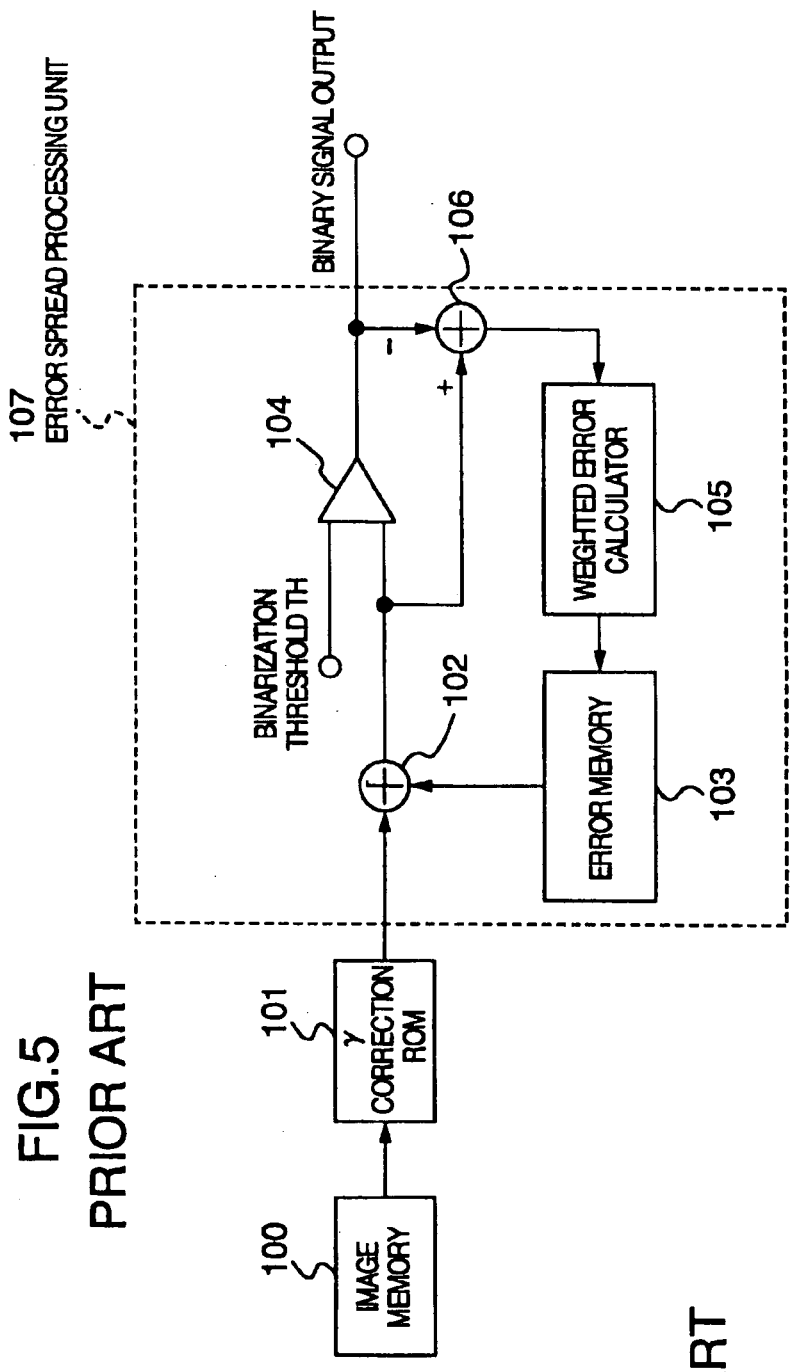
FIG. 5 is a block diagram showing a circuit for executing the conventional error spreading method.
FIG. 6 is a diagram for explaining an error matrix used in the conventional error spreading method.

In FIG. 4, first, a line of multivalued data of the image to be binarized is stored in the image memory 100 (step s200), and then the error data distributed to the pixels on this line are stored in the error memory 103 (step s210). The density data D1 of the pixel to be binarized from a line of the data is read and a weighted error in this pixel is added thereby to acquire the intended pixel data. At the same time, this pixel data is γ-corrected based on the correction data in the γ-correction ROM 101 (step s220).

Then, in the adjacent edge detector 108, the density data D2, D3 of the left and right adjacent pixels of the intended pixel are acquired from the image memory 100 (step s230), thereby calculating the density difference DL=|D1−D2| and DR=|D1−D3| between the density data D1 of the intended pixel and the density data D2 and D3 of the left and right pixels (step s240), respectively.

The density differences DL, DR thus obtained are compared with a setting S (step s250), and in the case where the density difference DL or DR is larger than the setting S, the threshold determining unit 109 detects this pixel as the one adjacent to the edge, and sets the threshold Th using the formula Th=128−D/N in accordance with the edge intensity (step s270). In the case where both the density differences DL and DR are smaller than the setting S, on the other hand, this pixel is determined as the one not adjacent to an edge and the threshold 128 is maintained (step s260).

After setting a threshold in this way, this intended pixel is binarized by error spreading (step s280), and thus the process for this pixel is terminated.

It is then determined whether the aforementioned process has been completed for all the pixels on the current line (step s290), and unless the process is not complete for all the pixels of the line, the process proceeds to the next pixel (step s310) for executing steps s220 to s280. In the case where the process for all the pixels on the line is complete, on the other hand, it is determined whether the process is complete for all the lines (step s300). Unless the process for all the lines is complete, the operation proceeds to the next line (step s320), and the same operation is repeated until the process for all the lines is completed.

As described above, according to this embodiment, the density difference between the intended pixel and adjacent pixels is determined, and in the case where the density difference is larger than a predetermined setting, the intended pixel is determined as an edge portion. In such a case, the threshold for binarizing the intended pixel constituting an edge portion is set to a value which is smaller, the larger the edge intensity with the adjacent pixels. As a result of this binarization, in the case where the edge intensity with the pixel adjacent to the intended pixel is large, the binarization threshold is set to a low value to increase the probability of dot generation. Otherwise, the binarization threshold is set to a high value for a lower probability of dot generation. As a result, the edge reproducibility of the binary image after the error spreading can be improved.

The thresholds used in this embodiment are only an example of numerical values that can be employed, and the invention is not limited to these numerical values.

It will thus be understood from the foregoing description that according to this invention, in the case where the edge intensity of an intended pixel with adjacent pixels is large, the binarization threshold is set to a low value for an increased probability of dot generation, and otherwise the binarization threshold is set to a high value for a reduced probability of dot generation. Thus, the edge reproducibility of a binary image after the error spreading process can be improved.

What is claimed is:

1. An image processing method for generating a binary image by binarizing pixels of multivalued tones, the method comprising:

determining an intended pixel;

determining a pixel adjacent to said intended pixel;

detecting a density difference between said intended pixel and said adjacent pixel;

determining said intended pixel to be an edge portion in a case where the detected density difference is larger than a predetermined setting; and setting, for the edge portion, a value of a binarization threshold to a first value when the detected density difference is a first magnitude and to a second value when the detected density difference is a second magnitude, wherein said first value is lower than said second value and said first magnitude is larger than said second magnitude.

2. An image processing apparatus for generating a binary image by binarizing pixels of multivalued tones, the apparatus comprising:

a first determination section that determines an intended pixel;

a second determination section that determines a pixel adjacent to said intended pixel;

a detection section that detects a density difference between said intended pixel and said adjacent pixel;

a third determination section that determines said intended pixel to be an edge portion if the detected density difference is larger than a predetermined setting; and a setting section that sets, for the edge portion, a value of a binarization threshold to a first value when the detected density difference is a first magnitude and to a second value when the detected density difference is a second magnitude, wherein said first value is lower than said second value and said first magnitude is larger than said second magnitude, thereby affecting the pixel binarization.

3. An image processing method for generating a binary image by binarizing pixels of multivalued tones, the method comprising:

determining an intended pixel;

determining a pixel adjacent to said intended pixel;

detecting a density difference between said intended pixel and said adjacent pixel; and setting a value of a binarization threshold to a first value when the detected density difference is a first magnitude and to a second value when the detected density difference is a second magnitude, wherein said first value is lower than said second value and said first magnitude is larger than said second magnitude.

4. An image processing apparatus for generating a binary image by binarizing pixels of multivalued tones, the apparatus comprising:

a first determination section that determines an intended pixel;

a second determination section that determines a pixel adjacent to said intended pixel;

a detection section that detects a density difference between said intended pixel and said adjacent pixel; and a setting section that sets a value of a binarization threshold to a first value when the detected density difference is a first magnitude and to a second value when the detected density difference is a second magnitude, wherein said first value is lower than said second value and said first magnitude is larger than said second magnitude.

* * * * *